… (continued)

United States Patent Office 3,729,525
Patented Apr. 24, 1973

3,729,525
DISPROPORTIONATION PROCESS
Robert L. Banks and Filippo Pennella, Bartlesville, Okla., assignors to Phillips Petroleum Company
No Drawing. Filed Apr. 23, 1971, Ser. No. 137,020
Int. Cl. C07c 3/62
U.S. Cl. 260—683 D                                5 Claims

ABSTRACT OF THE DISCLOSURE

The conversion of disproportionatable olefins is improved when using a catalyst comprising rhenium oxide and alumina by mixing with the feed material an effective amount of dicyclopentadiene or an alkyl-substituted derivative thereof.

BACKGROUND OF THE INVENTION

Field of the invention

This invention relates to olefin disproportionation.

BACKGROUND OF THE INVENTION

In recent years the petrochemical industry has sought new ways to provide various petrochemical feed stocks, among them light olefin materials. One process which has received recent attention has been the process wherein olefins of lesser value are upgraded to olefins of greater value. The process has been identified by many terms, but the one which appears to be gaining the greatest acceptance is olefin disproportionation.

A catalyst comprising rhenium oxide on alumina has been found to be useful in promoting olefin disproportionation and other related conversions. For example, this catalyst promotes disproportionation of acyclic olefins such as propylene into approximately equal molar amounts of ethylene and butenes. Similarly, two dissimilar olefins when co-reacted in the presence of this catalyst, provide other olefins and can include olefins of both higher and lower molecular weight than either of the starting olefins. In still other related conversions, various combinations of internal olefins, ethylene, and cyclic olefins have been found to react to produce other unsaturated products.

One type of olefin disproportionation conversion which has been of interest is the cleavage of cyclic olefinic compounds to acyclic olefin compounds in the presence of ethylene or another acyclic olefin. In this reaction, both the acyclic olefin and the cyclic olefin are generally present in substantial reagent amounts. An example of this reaction is the disproportionation conversion of ethylene and 1,5 - cyclooctadiene to produce 1,5,9-decatriene.

However, the most economically important of the olefin disproportionation conversions remains the conversion of acyclic olefins, mixtures of different acyclic olefins, or mixtures of acyclic olefins and ethylene to produce various other desirable acyclic olefin products.

OBJECTS OF THE INVENTION

It is an object of this invention to improve the conversion of acyclic olefins, mixtures of different acyclic olefins, and mixtures of acyclic olefins with ethylene in the presence of a rhenium oxide on alumina catalyst. Other objects and advantages of this invention will be apparent to those skilled in the art from a reading of the following summary of the invention, detailed description of the invention, and the claims.

SUMMARY OF THE INVENTION

We have found that the addition of only a minor amount of a certain class of cyclic polyenes into a reaction zone containing the rhenium oxide and alumina catalyst substantially increases the conversion of the acyclic olefins which are within the reaction zone. Accordingly, the process of our invention comprises contacting a disproportionatable feed material with a catalyst comprising rhenium oxide and alumina in the presence of dicyclopentadiene or an alkyl-substituted derivative thereof in an amount sufficient to increase the conversion of the feed material.

DETAILED DESCRIPTION OF THE INVENTION

The rhenium oxide and alumina catalyst which is used in our invention is the catalyst which is presently known to have activity for the disproportionation of olefins. The catalyst is predominantly alumina and contains from about 0.1 to about 40, preferably 1 to about 20 weight percent rhenium heptoxide based on the weight of the alumina.

The catalyst can be prepared by any suitable catalyst preparation technique such as by combining the suitable components by dry mixing, coprecipitation, impregnation and the like. The impregnation of a suitable catalytic grade of alumina with a rhenium compound convertible to the oxide upon calcination is presently preferred. Any catalytic grade of alumina, including gamma- and eta-alumina, and also including alumina which has been treated with acids or bases, or other treating agents to improve the effectiveness of the finished catalyst can be used. If desired, a small amount of inorganic base compound of an alkali or alkaline earth metal can be incorporated into the catalyst after rhenium has been associated with the alumina.

Prior to use, the catalyst is activated by heating at elevated temperatures such as by calcination in air at temperatures in the range of from about 700° to about 1500° F. After activation of the catalyst, it can be treated, if desired, with various other substances which sometimes exert a beneficial effect upon the conversion. Such substances include trialkyl aluminum compounds, carbon monoxide, hydrogen, and the like.

The conversion-modifying cyclic polyene additive of the present invention is dicyclopentadiene or an alkyl-substituted derivative of dicyclopentadiene such that the total number of carbon atoms in the molecule does not exceed about 20, and preferably does not exceed about 15. Thus, the conversion-modifying additive can be represented by the formula

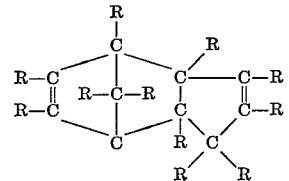

wherein each R is selected from hydrogen or an alkyl radical having from 1 to about 10 carbon atoms, such that the total number of carbon atoms in the molecule does not exceed 20, preferably about 15. Suitable alkyl groups are methyl, ethyl, propyl, isobutyl, hexyl, isooctyl, decyl and the like and mixtures thereof.

The dicyclopentadiene additive will be present in the reaction zone in amounts ranging from about 0.01 to about 5, preferably from about 0.1 to 1 liquid volume percent of the total olefinic feed.

The olefinic feeds which can be converted according to the process of our invention are acyclic monoolefins having at least 3 carbon atoms per molecule including cycloalkyl, cycloalkenyl and aryl derivatives thereof, mixtures of these olefins, and mixtures of ethylene and these olefins. Some non-limiting examples of suitable acyclic olefins including propylene, 1-butene, isobutene, 2-butene, 1-pentene, 2-pentene, 1-hexene, 2-heptene, 3-hexene, 1-octene, 2-nonene, 1-dodecene, 5-dodecene, 2-tetradecene, 4-vinylcyclohexene, 1-hexadecene, 2-methyl-1-butene, 2-methyl-2-butene, 3-methyl-1-butene, 4-methyl-2-butene, 1-phenylbutene-2, 4-octene, 3-eicosene, 3-heptene, 4-triacontene, and the like and mixtures thereof.

When converting ethylene and a mixture of the acyclic olefins, the amount of ethylene employed in the feed to the reaction zone will preferably be in molar excess. Generally, molar ratios of ethylene to acyclic olefins in excess of 3:1 are sufficient to insure the desirable conversion. When mixtures of ethylene and acyclic olefins are employed as the feed to the reaction zone, the acyclic olefins will have at least 4 carbon atoms per molecule.

According to the process of our invention, the olefinic feed stream containing a conversion-modifying amount of a dicyclopentadiene compound is contacted with the catalyst at a temperature in the range of from about −60 to about 1000° F., preferably from about 0 to about 500° F. Any convenient pressure can be utilized, and pressures in the range of from about 0 to about 2000 p.s.i.g. are suitable. The reaction can be carried out either batchwise or continuously using any suitable mode of contact in any suitable reaction apparatus. Continuous reactions are presently preferred and space rates, depending upon the reactivity of the specific feed system and the degree of conversion desired, will generally be in the range of from about 0.1 to about 1000, preferably about 5 to about 300 WHSV. When batchwise operations are employed the reaction time is conveniently in the range of from 0.1 minute to 24 hours. If desired, the olefinic feed stream can be diluted with other inert diluents such as aromatic and saturated aliphatic hydrocarbons. The olefinic feed stream can be a broad mixture of acyclic olefins such as is found in refinery streams.

After leaving the reaction zone, the reaction mixture can be separated by conventional means such as fractionation and the desired products isolated and recovered. Any unreacted feeds can be recycled to the reaction zone for further conversion therein.

The invention is illustrated by the following examples which are submitted to illustrate the process of our invention. However, the data which is presented herein should not be construed to unduly limit our invention as described above.

EXAMPLE I

In this example, the present invention is illustrated by the disproportionation of two propylene streams. The first propylene stream is one containing 10 parts propane and 90 parts propylene by weight. The second propylene stream is one which is identical to the first except that it also contains 0.5 weight percent (about 0.3 liquid volume percent) of dicyclopentadiene (DCPD).

The conversion was carried out in a fixed bed reactor containing a 14 weight percent rhenium heptoxide on alumina olefin disproportionation catalyst. The catalyst had been previously activated in flowing air at 1100° F. for about 1.5 hours. It had then been cooled in flowing nitrogen to operating temperature.

At a temperature of 100° F., a pressure of 300 p.s.i.g., and at a weight hourly space velocity of 20, the two feeds were passed through the reactor in an alternating fashion. The results of the tests are shown in the Table I.

TABLE 1

Disproportionation of propylene over $Re_2O_7/Al_2O_3$ catalyst

Time on stream, min.:      Conversion, percent

Untreated feed
- 20 _____ 13.1
- 41 _____ 10.6
- 62 _____ 9.4
- 82 _____ 8.6
- 102 _____ 9.7
- 122 _____ 16.9

TABLE 1—Continued

Time on stream, min.:      Conversion, percent

Changed to DCPD-containing feed
- 142 _____ 17.3
- 163 _____ 17.1

Changed back to untreated feed
- 183 _____ 14.9
- 222 _____ 8.0
- 242 _____ 8.7

The data in the table above show that, in the presence of dicyclopentadiene conversion-modifying agent, the conversion of propylene is increased over that of the level shown during the period with the untreated propylene. However, the promoting effecting of the dicyclopentadiene was not permanent. When the flow of this modifying agent was halted, the conversions rapidly fell off again.

EXAMPLE II

To illustrate the unpredictability of the present discovery, the effect of the dicyclopentadiene on the disproportionation of propylene using another olefin disproportionation catalyst, namely, the well known cobalt molybdate/alumina olefin disproportionation catalyst, is shown.

In a run similar to that of Example I and using the same feeds and the same fixed bed reactor the catalyst in this instance is one containing 11% $MoO_3$, 3.4% CoO, and 85.6 $Al_2O_3$ by weight. It was activated at 1100° F. for 1 hour then cooled to operating temperature in flowing nitrogen. The conversion was carried out at 350° F., at 300 p.s.i.g., and at 20 WHSV. The results of the tests are shown below in Table 2.

TABLE 2

Disproportionation of propylene over $CoO\ MoO_3/Al_2O_3$

Time on stream, min.:      Conversion, percent

Untreated feed
- 20 _____ 15.0
- 39 _____ 23.1
- 60 _____ 20.7

Changed to DCPD-containing feed
- 80 _____ 9.4
- 100 _____ 8.0
- 120 _____ 2.1

Changed back to untreated feed
- 140 _____ 1.2
- 160 _____ 1.3
- 180 _____ 1.6

The data in the table show that, unlike Example I using the rhenium-containing catalyst, the presence of dicylopentadiene in the feed did not show advantage in the disproportionation of propylene over the cobalt molybdate/alumina olefin disproportionation catalyst.

Reasonable variations of our invention will be apparent to those skilled in the art without departing from the spirit and scope thereof.

We claim:

1. In a process of disproportionating a feed material comprising acyclic monoolefins having at least 3 carbon atoms per molecule including cycloalkyl, cycloalkenyl, and aryl substituted derivatives thereof, mixtures of such olefins, and mixtures of such olefins with ethylene using a catalyst comprising rhenium oxide and alumina, the improvement comprising conducting the reaction in the presence of a compound having the formula

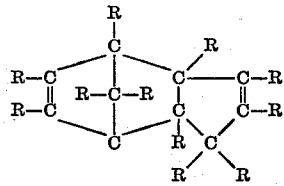

wherein each R is selected from hydrogen or an alkyl radical having from 1 to about 10 carbon atoms, such that the total number of carbon atoms in the molecule does not exceed about 20, in an amount from about 0.1 to about 5 liquid volume percent of the total olefinic feed sufficient to increase the conversion of the feed material.

2. The process of claim 1 wherein the total number of carbon atoms of the compound designated by the formula does not exceed about 15.

3. A process according to claim 2 wherein the compound designated by the formula is dicylopentadiene.

4. The process of claim 1 wherein the feed material is contacted with a catalyst in the presence of said compound of the formula at a temperature in the range of about −60 to about 1000° F. at a pressure of about 0 to about 2000 p.s.i.g.

5. The process of claim 1 wherein the feed material is propylene and the compound of the formula is dicylopentadiene.

References Cited

UNITED STATES PATENTS

| 3,527,828 | 9/1970 | Mango | 260—680 |
| 3,549,722 | 12/1970 | Pennella | 260—683 |
| 3,538,180 | 11/1970 | Reusser | 260—683 |
| 3,505,420 | 4/1970 | Amiard et al. | 260—666 |
| 3,381,046 | 4/1968 | Cohen et al. | 260—666 |

DELBERT E. GANTZ, Primary Examiner

C. E. SPRESSER, JR., Assistant Examiner

U.S. Cl. X.R.

260—666 A, 668 R, 677 R, 680 R